(12) United States Patent
Uda

(10) Patent No.: US 7,755,507 B2
(45) Date of Patent: Jul. 13, 2010

(54) DISTRIBUTED CONTROL SYSTEM AND CONTROL DEVICE THEREOF

(75) Inventor: Toshiaki Uda, Nishikamo-gun (JP)

(73) Assignee: DENSO Corporation, Kariya (JP)

( * ) Notice: Subject to any disclaimer, the term of this patent is extended or adjusted under 35 U.S.C. 154(b) by 1007 days.

(21) Appl. No.: 11/330,117

(22) Filed: Jan. 12, 2006

(65) Prior Publication Data

US 2006/0161747 A1      Jul. 20, 2006

(30) Foreign Application Priority Data

Jan. 19, 2005    (JP) .............................. 2005-011956

(51) Int. Cl.
*G08C 19/16* (2006.01)
(52) U.S. Cl. .................... 340/870.24; 340/870.07; 340/870.19
(58) Field of Classification Search ............ 340/870.06, 340/870.07, 870.19, 870.24
See application file for complete search history.

(56) References Cited

U.S. PATENT DOCUMENTS 4,743,901 A * 5/1988 Yamanoue et al. ..... 340/870.11
4,748,446 A * 5/1988 Hayworth .............. 340/825.64
5,202,682 A * 4/1993 Finger ................... 340/870.19
6,653,968 B1 * 11/2003 Schneider .................... 341/178

FOREIGN PATENT DOCUMENTS

| JP | 60-180245 | 9/1985 |
| JP | 7-71068 | 7/1995 |
| JP | 07-193880 | 7/1995 |
| JP | 3389643 | 1/2003 |
| JP | 2003-131735 | 5/2003 |

OTHER PUBLICATIONS

Office Action dated Sep. 24, 2009 issued in corresponding Japanese Application No. 2005-011956 with an at least partial English-language version thereof.

* cited by examiner

*Primary Examiner*—Albert K Wong
(74) *Attorney, Agent, or Firm*—Nixon & Vanderhye P.C.

(57) ABSTRACT

A control device that is used in a distributed control system and controlling a control target while serially transmitting data to a reception side control device by a pulse train signal, wherein when the control target is normal, state quantity data representing the state quantity of the control target is transmitted to the reception control device, and when abnormality occurs in the control target, the abnormality data representing the abnormality concerned and the state quantity data are transmitted to the reception control device in a predetermined order.

4 Claims, 17 Drawing Sheets

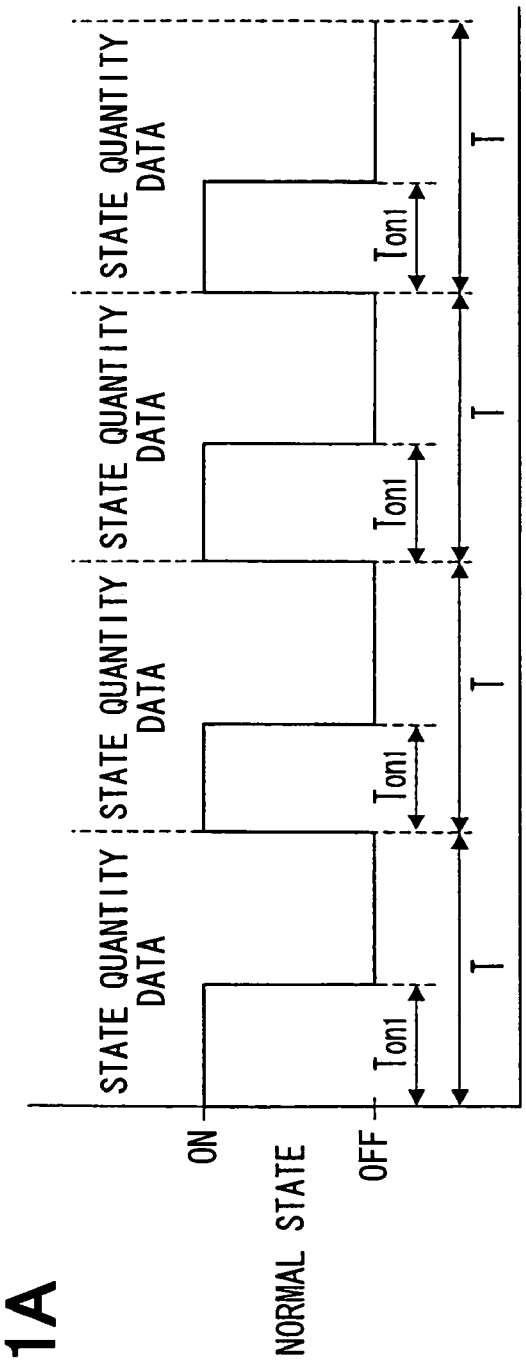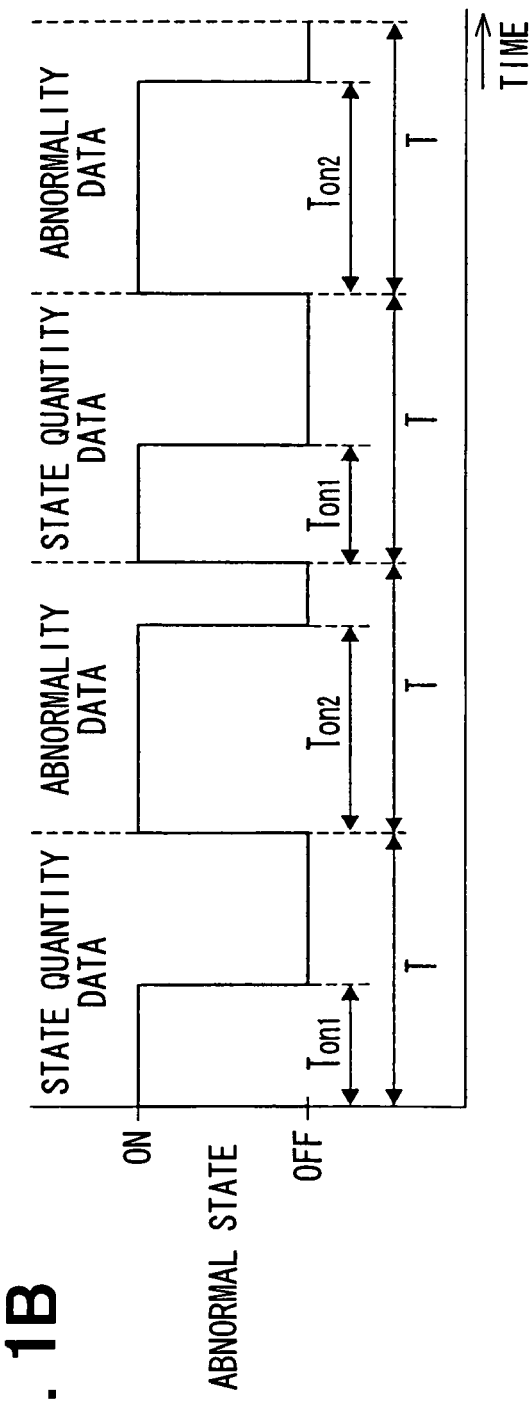

| TYPE OF ABNORMALITY | ON-TIME Ton2 |
|---|---|
| SITE A ABNORMAL | 80ms |
| SITE B ABNORMAL | 90ms |
| SITE C ABNORMAL | 100ms |

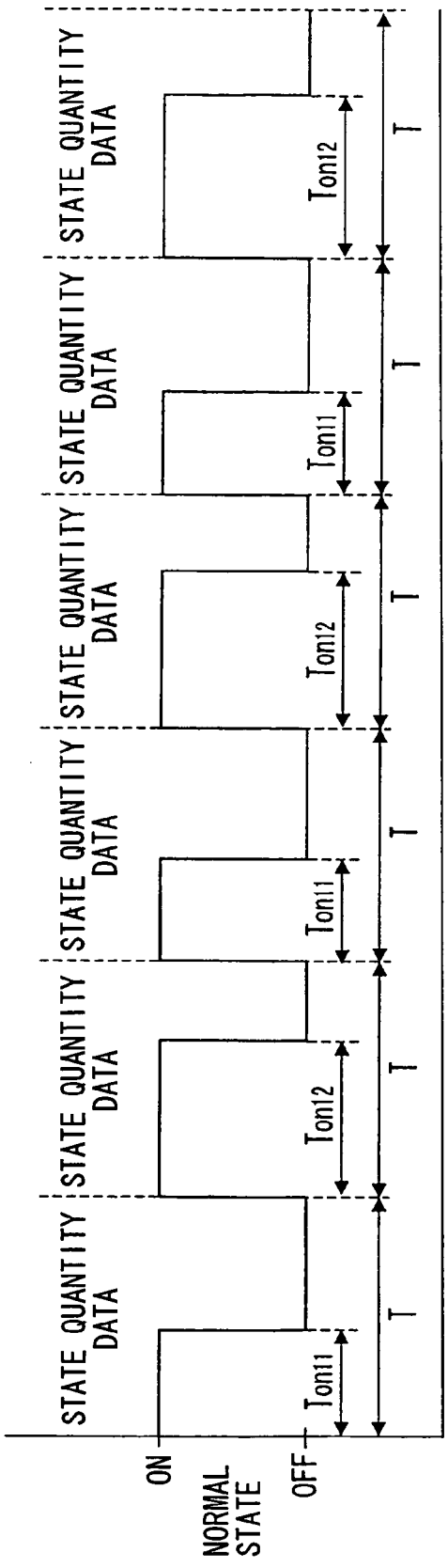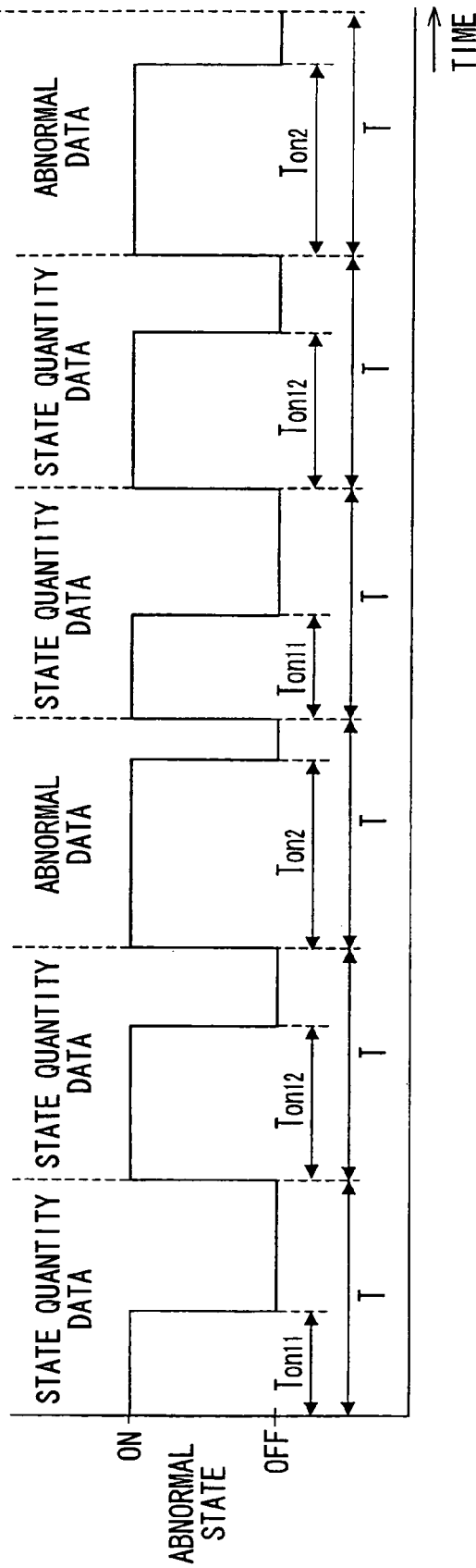

| TYPE OF ABNORMALITY | ON-DUTY RATIO Don2 |
|---|---|
| SITE A ABNORMAL | 85% |
| SITE B ABNORMAL | 90% |
| SITE C ABNORMAL | 95% |

| TYPE OF ABNORMALITY | ON-DUTY RATIO Don2 |
|---|---|
| SITE A ABNORMAL | 20% |
| SITE B ABNORMAL | 30% |
| SITE C ABNORMAL | 40% |
| SITES A, B ABNORMAL | 50% |
| SITES B, C ABNORMAL | 60% |
| SITES A, C ABNORMAL | 70% |
| SITES A, B, C ABNORMAL | 80% |

DISTRIBUTED CONTROL SYSTEM AND CONTROL DEVICE THEREOF

CROSS REFERENCE TO RELATED APPLICATION

This application is based upon, claims the benefit of priority of, and incorporates by reference the contents of, Japanese Patent Application No. 2005-11956 filed on Jan. 19, 2005.

TECHNICAL FIELD

The technical field relates to a distributed control system for dispersively controlling control targets of plural control devices while serially transmitting data among the plural control devices with a pulse train signal, and a device for controlling the distributed control system.

BACKGROUND

A distributed control system in which plural control devices are mutually connected to one another through signal lines have been hitherto used in various fields. For example, a vehicle is equipped with a distributed control system for controlling control targets such as an engine, a transmission, etc. by an engine control device, a transmission control device, etc. while data are delivered among these control devices.

The distributed control system as described above broadly uses a method of serially transmitting plural kinds of data with a pulse train signal for the communications among the control devices. As the communication method as described above are known a method of alternately transmitting data and header data representing the attribute of the data concerned (see JP-B-7-71068; patent document 1), and a method of allocating different kinds of data to the on-timing interval and the off-timing interval of two pulses and then transmitting the data (see Japanese Patent No. 3389643; patent document 2).

However, when one kind of data D are transmitted according to the method disclosed in the patent document 1, as shown in FIG. 20A, the time corresponding to one period is consumed for each of transmission of the data D and transmission of the header data H, that is, totally the time corresponding to two periods (2t) is consumed. Therefore, there is some limitation to enhance the communication efficiency, and thus this method is undesirable.

Furthermore, according to the method disclosed in the patent document 2, as shown in FIG. 20B, the time consumed for the transmission of each of the two kinds of data D1, D2 is suppressed to one period, and thus the communication efficiency can be more enhanced by the method disclosed in the patent document 2 than that by the method disclosed in the patent document 1. However, as a result of diligent studies of the inventor of this application, it has been found that the following problem would occur if the data representing the state quantity of the control target and the data representing abnormality of the control target are transmitted as the data D1, D2 respectively to secure safety of the distributed control system. The problem resides in that the data D2 representing abnormality of the control target is needed only when the abnormality concerned occurs, and thus the data D2 becomes substantially unnecessary dummy data when the control target is normal. That is, when the control target is normal, one kind of data D1 is transmitted equivalently by consuming the time corresponding to the two periods (2t), and thus the enhancing effect of the communication efficiency is hardly achieved.

SUMMARY

It is an object to provide a distributed control system and a control device therefore that can secure safety when a control target is abnormal, and also enhance the communication efficiency when the control target is normal.

According to a first aspect, there is provided a distributed control system for dispersively controlling plural control devices while data are serially transmitted with a pulse train signal among the plural control devices.

According to the distributed control system of the first aspect, when abnormality occurs in a control target of a transmission side control device, abnormality data representing the abnormality concerned and state quantity data representing the state quantity of the control target of the transmission side control device are transmitted from the transmission side control device to a reception side control device in a predetermined order. Accordingly, the abnormality occurring in the control target of the transmission side control device can be recognized by the reception side control device, and thus the control corresponding to the abnormality can be executed by each control device, and thus the safety can be secured. Furthermore, according to the distributed control system as described above, when the control target of the transmission side control device is normal, the data transmitted from the transmission side control device to the reception side control device is state quantity data representing a state quantity of the normal control target concerned. That is, when the control target of the transmission side control device normal, no abnormality data is transmitted from the transmission side control device to the reception side control device, and thus the time to be consumed for the transmission of one kind of state quantity data can be suppressed to the time of one period of the pulse. Accordingly, the communication efficiency can be more greatly enhanced as compared with the conventional control device.

The state quantity of the control target contains a physical quantity such as speed, temperature, opening degree, angle, position, rotational number, load, pressure, flow rate or the like of the control target, or a digitalized value of a state such as an on/off state, a position state or the like.

Furthermore, the control device constituting the distributed control system may have only the function as the transmission side control device, or may have only the function as the reception side control device, or may have both the functions according to a second aspect.

According to the distributed control system according to a third aspect, when abnormality occurs in the control target of the transmission side control device, the abnormality data and the state amount data are alternately transmitted, and thus the signal processing in the transmission side control device and the reception side control device can be simplified. The simplification of the signal processing as described above contributes increase of the total communication speed containing the signal processing speed, and thus contributes to enhancement of the communication efficiency.

In the distributed control system according to the third aspect, with respect to the transmission order of the abnormality data and the state quantity data, any data may be transmitted preferentially. Furthermore, the transmission order of the abnormality data and the state quantity data is not limited to that of the third aspect. For example, before or after transmission of abnormality data, plural state quantity data may be transmitted.

Here, the on-time or off-time of the pulse train signal is defined as a noted time.

According to the distributed control system of a fourth aspect, the noted time of the pulse train signal when the state quantity data is transmitted is made different from the noted time of the pulse train signal when the abnormality data is transmitted, whereby it can be surely identified at the reception side control device which one of the state quantity data and the abnormality data the reception data corresponds to. Accordingly, it is unnecessary to transmit a signal for data identification from the transmission side control device to the reception side control device, and thus the number of signal lines can be reduced.

According to the distributed control system of a fifth aspect, with respect to the noted time of the pulse train signal when the state quantity data is transmitted and the noted time of the pulse train signal when the abnormality data is transmitted, the range of the former is set to be broader than the latter range. Accordingly, the resolution of the state quantity data can be enhanced, and thus the communication precision can be enhanced.

Here, the on-duty ratio or off-duty ratio of the pulse train signal is defined as a noted duty ratio.

According to the distributed control system of a sixth aspect, when the noted duty ratio of the pulse train signal when the state quantity data is transmitted is made different from the noted duty ratio of the pulse train signal when the abnormality data is transmitted, whereby at the reception side control device, it can be surely identified which one of the state quantity data and the abnormality data the reception data corresponds to. Accordingly, it is unnecessary to transmit the signal for data identification from the transmission signal side control device to the reception side control device, and thus the number of signal lines can be reduced.

According to the distributed control system according to a seventh aspect, with respect to the noted duty ratio of the pulse train signal when the state quantity data is transmitted and the noted duty ratio of the pulse train signal when the abnormality data is transmitted, the range of the former is set to be broader than the range of the latter, whereby the resolution of the state quantity data can be enhanced and thus the communication precision can be enhanced.

According to the distributed control system of an eighth aspect, the pulse period of the pulse train signal when the state quantity data is transmitted is made different from the pulse period of the pulse train signal when the abnormality data is transmitted, whereby the reception side control device can surely identify which one of the state quantity data and the abnormality data the reception data corresponds. Accordingly, it is unnecessary to transmit the signal for data identification from the transmission side control device to the reception side control device, and thus the number of signal lines can be reduced.

According to the distributed control system of a ninth aspect, the pulse period of the pulse train signal when the state quantity data is transmitted is set to be shorter than the pulse period of the pulse train signal when the abnormality data is transmitted. Accordingly, when the control target of the transmission side controller is normal, the pulse period of the pulse train signal is set to be as short as possible, whereby the effect of increasing the communication efficiency can be enhanced.

According to a tenth aspect, there is provided a control device that is used in a distributed control system and controls a control target while serially transmitting data to a reception side control device with a pulse train signal. According to the control device of the tenth aspect, when abnormality occurs in the control target, abnormality data representing the abnormality concerned and state quantity data representing the state quantity of the control target are transmitted to the reception side control device in a predetermined order. Accordingly, the control device of the tenth aspect enables the reception side control device to recognize the abnormality occurring in the control target, and for example the control corresponding to the abnormality is executed by each control device, whereby the safety can be secured. Furthermore, according to the control device of the tenth aspect, when the control target is normal, the data to be transmitted to the reception side control device is state quantity data representing the state quantity of the control target. That is, according to the control device of the tenth aspect, when the control target is normal, no abnormality data is transmitted to the reception side control device, and thus the time consumed for the transmission of one kind of state quantity data can be suppressed to the time of one period. Accordingly, the communication efficiency can be enhanced as compared with the prior art.

According to an eleventh aspect, there is provided a control device that is used in a distributed control system and controls a control target while receiving data serially-transmitted from the transmission side control device with a pulse train signal. According to the control device of the eleventh aspect, when abnormality occurs in the control target of the transmission side control device, abnormality data representing abnormality and state quantity data representing the state quantity of the control target of the transmission side control device are received from the transmission side control device in a predetermined order, whereby the control device of the eleventh aspect can recognize the abnormality occurring in the control target of the transmission side control device, and thus the control corresponding to the abnormality can be executed by each control device of the distributed control system and thus the safety can be secured. Furthermore, according to the control device of the eleventh aspect, when the control target of the transmission side control device is normal, the state quantity data representing the state quantity of the normal control target concerned is received from the transmission side control device. That is, in the control device of the eleventh aspect, when the control target of the transmission side control device is normal, no abnormality data is transmitted from the transmission side control device. Therefore, the time to be consumed for the transmission of one kind of static quantity data can be suppressed to the time of one period of the pulse. Accordingly, the communication efficiency can be more greatly enhanced as compared with the prior art.

In the control device of the tenth and eleventh aspect, a construction conforming with the third to ninth aspects may be adopted. Furthermore, the control devices of the tenth and eleventh aspects may be implemented by the same control device.

BRIEF DESCRIPTION OF THE DRAWINGS

Additional objects, features and advantages will be best understood from the following description, the appended claims and the accompanying drawings in which:

FIGS. 1A-1B are diagrams showing the operation of a distributed control system according to a first embodiment;

FIGS. 8A-8B are diagrams showing the operation of the distributed control system according to the second embodiment;

DETAILED DESCRIPTION OF THE PREFERRED EMBODIMENTS

Preferred embodiments will be described hereunder with reference to the accompanying drawings.

First Embodiment

Figure 2:
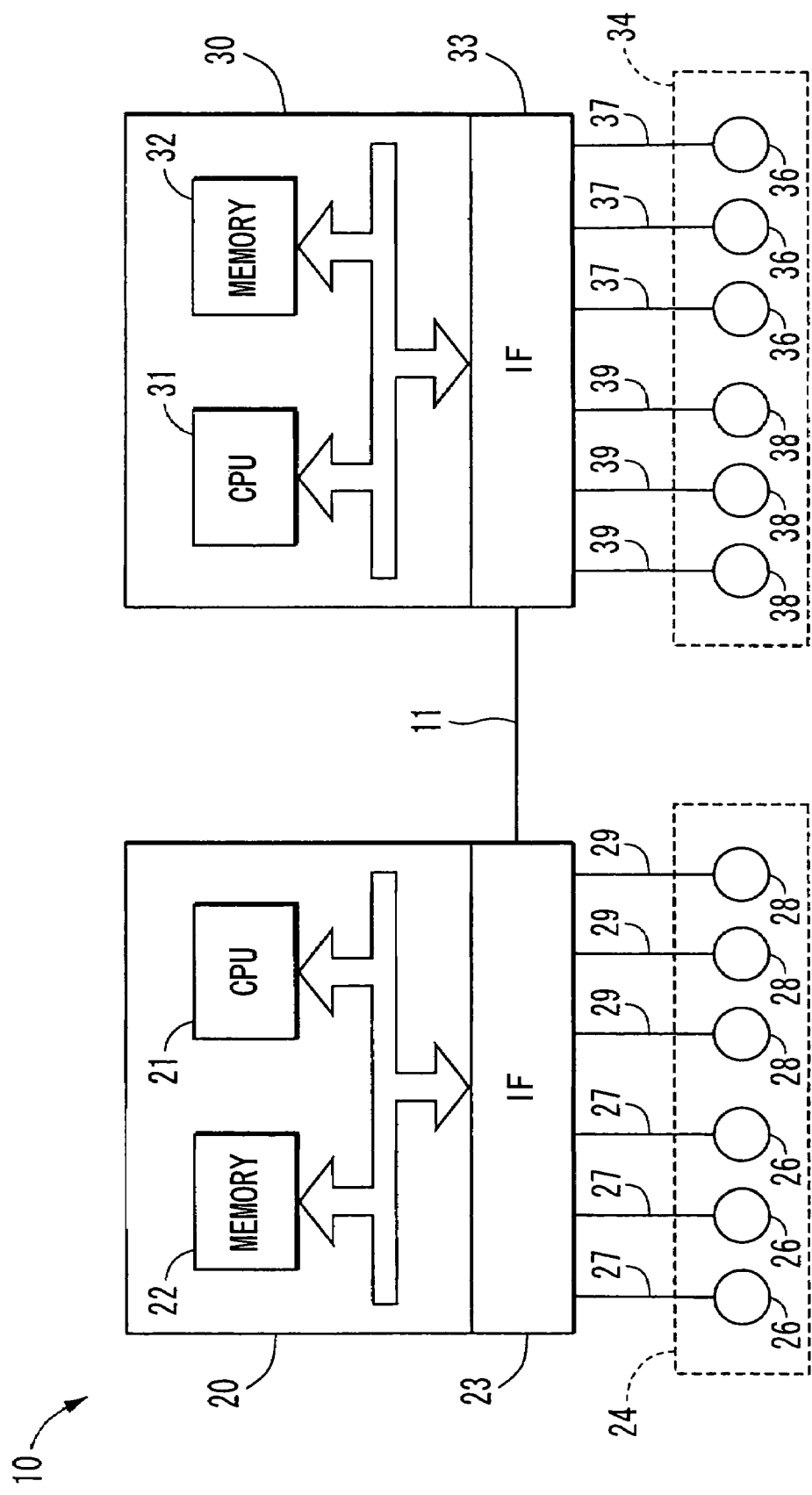
FIG. 2 is a block diagram showing the distributed control system according to the first embodiment.

FIG. 2 shows a distributed control system according to a first embodiment. The distributed control system 10 is an electrical control system for a vehicle in which plural control devices 20 and 30 are mutually connected to each other through a signal line 11. Each of the control devices 20, 30 is mainly constructed by a microcomputer having CPU 21, 31, a memory 22, 32 and an input/output interface 23, 33.

A transmission control device 20 electrically controls a hydraulic control circuit of stepped or stepless type automatic transmission 24 by executing a control program stored in the memory 22 through CPU 21. Specifically, plural transmission sensors 26 such as an input/output shaft rotating number sensor, a range sensor, a hydraulic sensor, a oil temperature sensor, etc. are connected to the input/output interface 23 of the transmission control device 20 through signal lines 27. The transmission control device 20 receives an output signal from each transmission sensor 26 to extract detection data of each transmission sensor 26 transmitted through the signal concerned.

Furthermore, plural circuit electrical components 28 such as electromagnetic valves, etc. constituting the hydraulic control circuit of the automatic transmission 24 are connected to the input/output interface 23 of the transmission control device 20 through signal lines 29. The transmission control device 20 generates a control signal to be output to each circuit electrical component 28 and a data signal to be output to an engine control device 30 on the basis of the data extracted from the output signal of each transmission sensor 26. Here, the data signal is a pulse train signal achieved by converting predetermined data to on-time $T_{on}$ of one pulse.

The engine control device 30 electrically controls an engine 34 of internal combustion type, hybrid type or the like by executing the control program stored in the memory 32 through CPU 31. Specifically, the input/output interface 23 of the transmission control device 20 is connected to the input/output interface 33 of the engine control device 30 through the signal line 11. The engine control device 30 receives the data signal corresponding to the output signal of the transmission control device 20 to extract data transmitted through the signal.

The input/output interface 33 of the engine control device 30 is connected to plural engine sensors 36 such as a throttle opening degree sensor, an acceleration opening degree sensor, an air-intake sensor, a water temperature sensor, etc. through signal lines 37. The engine control device 30 receives an output signal of each engine sensor 36 to extract the detection data of each engine sensor 36 transmitted through the signal concerned.

Furthermore, plural engine electrical components 38 such as a throttle device, an injector, an igniter, etc. are connected to the input/output interface 33 of the engine control device 30 through signal lines 39. The engine control device 30 generates a control signal to be output to each engine electrical component 38 on the basis of the data extracted from the output signals of the transmission control device 20 and each engine sensor 36.

Figure 3:
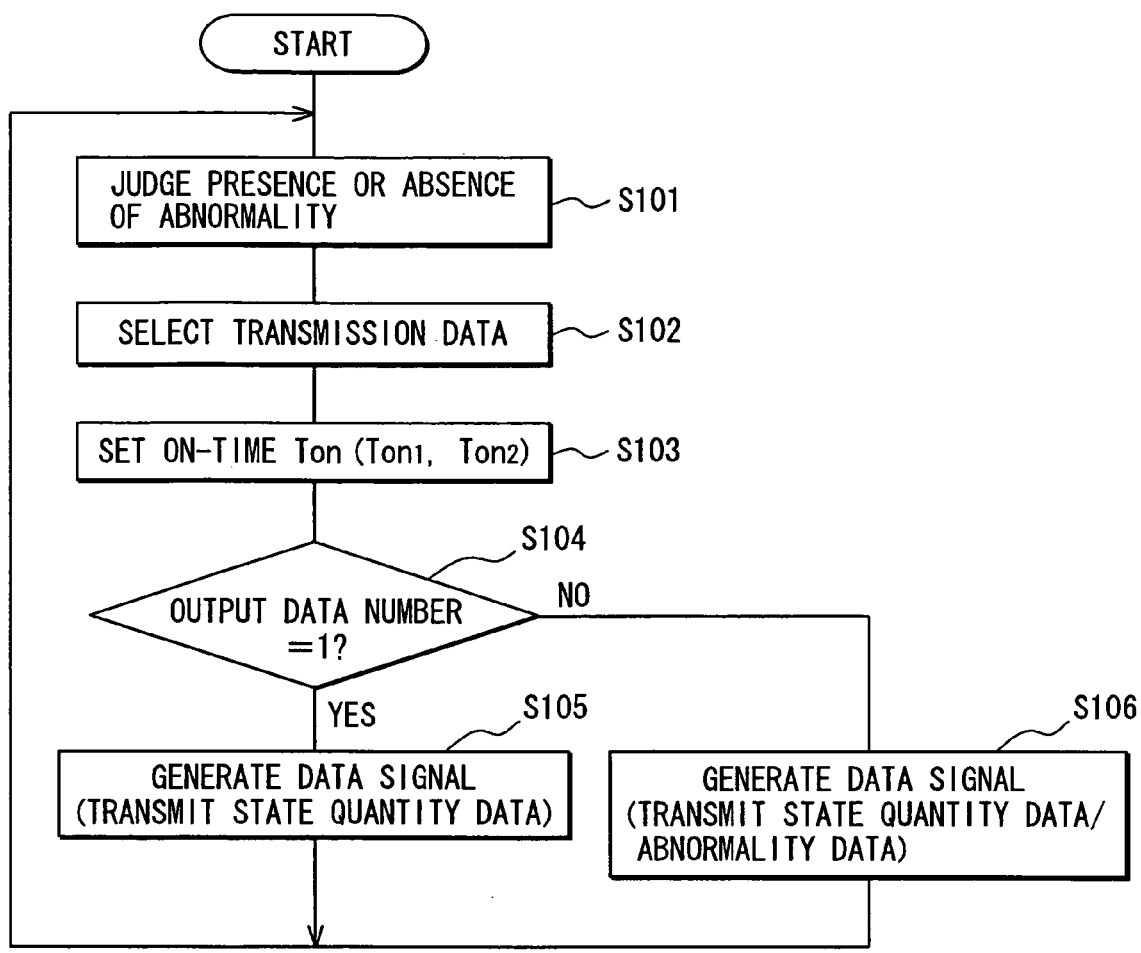
FIG. 3 is a flowchart showing the operation of the distributed control system according to the first embodiment.

Next, the data signal generating flow in the transmission control device 20 will be described with reference to FIG. 3.

In step S101, the presence or absence of occurrence of abnormality in the automatic transmission 24 is judged. At this time, the abnormality of the automatic transmission 24 is judged for one or plural predetermined target sites on the basis of detection data of one or plural specific transmission sensors 26, the reception status of the control signal of the circuit electrical components 28, etc. When detecting an abnormal site of the automatic transmission 24, the transmission control device 20 executes the fail safe control for securing the safety on the automatic transmission 24 according to a flow different from the above flow.

In step S102, data to be transmitted to the engine control device 30 is selected from the state quantity data representing the state quantity of the automatic transmission 24 and the abnormality data representing the abnormality of the automatic transmission 24 on the basis of the data signal. At this time, when the step is subsequent to the judgment of the step S101 that there is no abnormality, only the state quantity data is selected. On the other hand, when the step is subsequent to the judgment of the step S101 that there is some abnormality, both the state quantity data and the abnormality data are selected. Here, the state quantity data may be detection data of one transmission sensor 26 representing one state quantity, or may be one state quantity calculated on the basis of the detection data of the plural transmission sensors 26, for example, data representing a torque-down quantity based on gear shift or the like. Furthermore, the abnormality data are data representing the type of abnormality, specifically, the data representing a site which is judged as being abnormality in step S101.

Figures 4, 5:
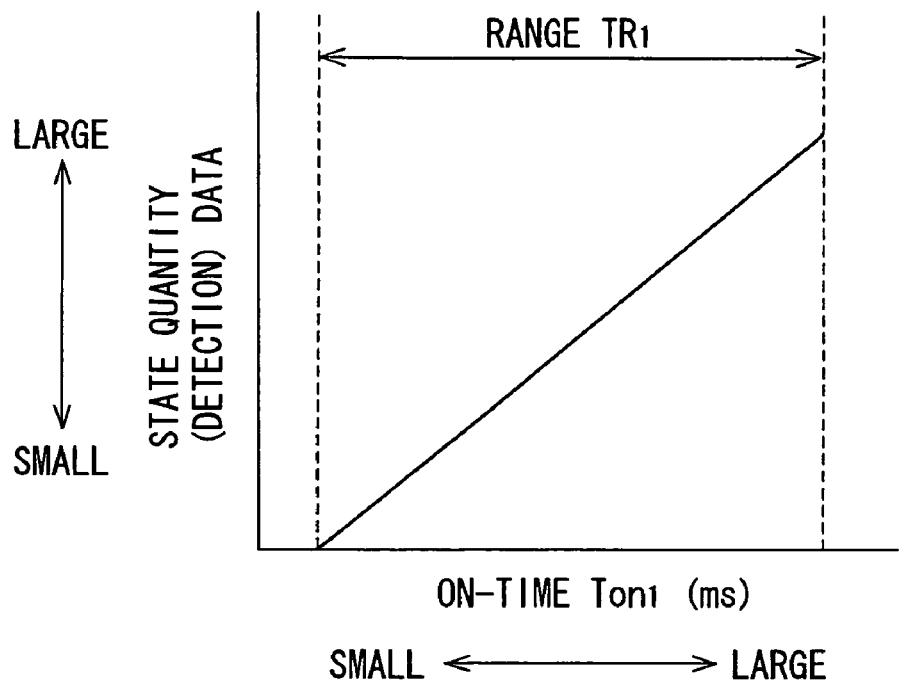
FIG. 4 is a diagram showing the operation of the distributed control system according to the first embodiment.
FIG. 5 is a diagram showing the operation of the distributed control system according the first embodiment.

In step S103, an ON-time $T_{on}$ to which the data selected in step S102 in the data signal is allocated is set. At this time, when the step is subsequent to the step S102 selecting only the state quantity data, the on-time $T_{on1}$ to which the state quantity data is allocated as shown in FIG. 1A is set in the range of a first time range $TR_1$. Here, the first time range $TR_1$ is preset to the range of 10 ms to 75 ms, and the on-time $T_{on1}$ is set so as to have such a linear relationship as shown in FIG. 4 with the numerical value of the detection data corresponding to the state quantity data, for example. When the step is subsequent to the step S102 selecting both the state quantity data and the abnormality data, the on-time $T_{on1}$ to which the state quantity data is allocated is set in the range of the first time range $TR_1$ as shown in FIG. 1B, and also an on-time $T_{on2}$ to which the abnormality data is allocated as shown in FIG. 1B is set in the range of a second range $TR_2$. Here, with respect to the first time range $TR_1$ and the on-time $T_{on1}$, it is the same as the case where the step is subsequent to the step S102 selecting only the state quantity data. Furthermore, the second time range $TR_2$ is preset to a value, for example, in the range from 80 ms to 100 ms, so that it is not overlapped with the first time range $TR_1$, and more preferably so that it is narrower than the first time range $TR_1$. Furthermore, for example when there exist plural target sites of abnormality judgment as shown in FIG. 5, the on-time $T_{on2}$ is set to a discrete value for every site (A, B, C).

It is judged in step S104 whether the number of the data selected in step S102 is equal to one or not. If the number of the selected data is equal to one, that is, under the normal state that only the state quantity data is output, the processing shifts to step S105. If the number of the selected data is not equal to one, that is, under the abnormal state that both the state quantity data and the abnormality data are output, the processing shifts to step S106.

In step S105, the pulse of the on-time $T_{on1}$ set in step S103 is output at a predetermined period T by using an internal clock of CPU 21, thereby generating the data signal. After the step S105 is finished, the processing returns to step S101. Accordingly, when the steps S101 to S105 are repetitively executed because the automatic transmission 24 is normal, one kind of state quantity data is serially transmitted at the time corresponding to one period T as shown in FIG. 1A.

On the other hand, in step S106, each of the pulse of the on-time $T_{on1}$ set in step S103 and the pulse of the on-time $T_{on2}$ set in step S103 are serially output at the period T by using the internal clock of CPU 21, thereby generating the data signal. At this time, as shown in FIG. 1B, the latter pulse may be output after the former pulse is output as shown, or the former pulse may be output after the latter pulse is output. Even after the step S106 as described above is finished, the processing returns to the step S101 as in the case of the step S105. Accordingly, when the steps S101 to s104, S106 are repetitively executed because abnormality occurs in the automatic transmission 24, for example, the state quantity data and the abnormality data are alternately serially transmitted every time corresponding to one period T.

Figure 6:
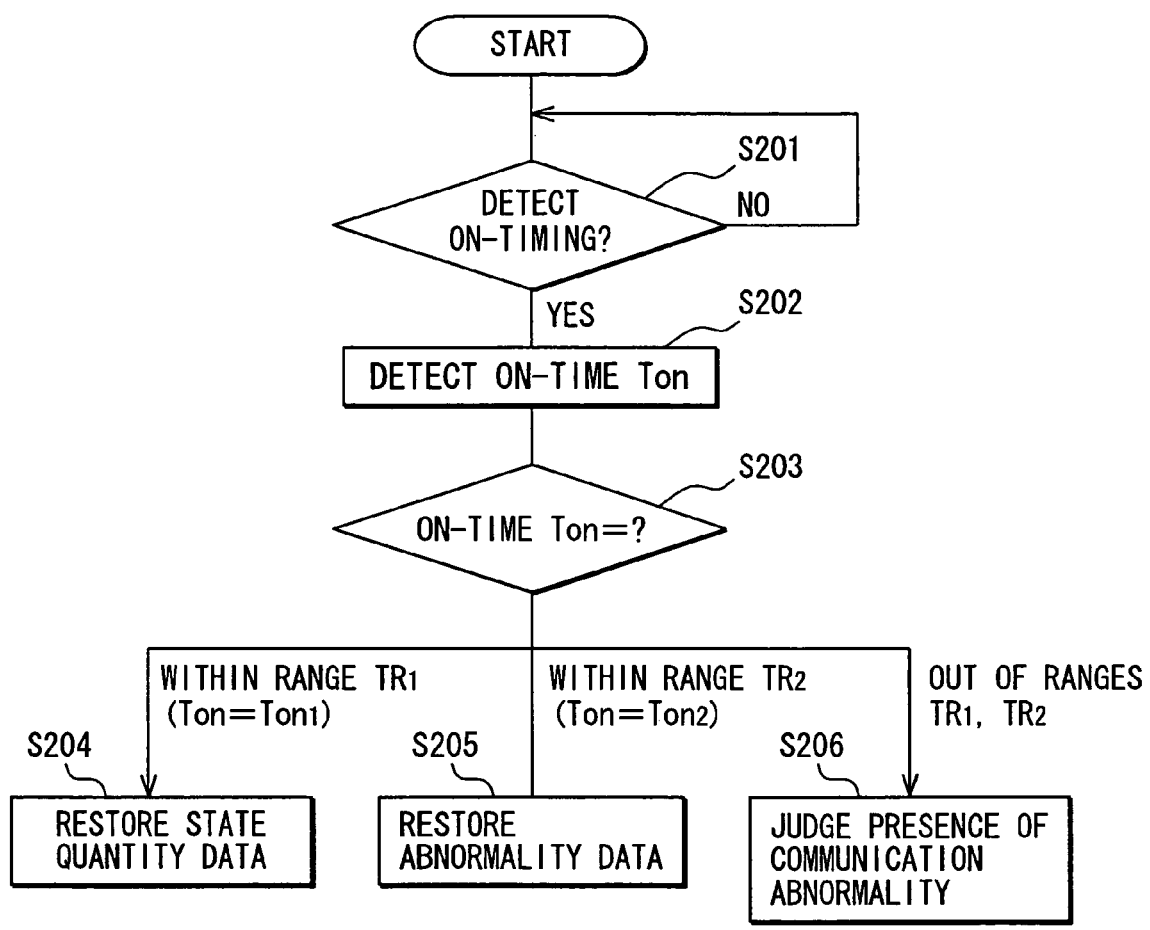
FIG. 6 is a flowchart showing the operation of the distributed control system according to the first embodiment.

Next, a flow of extracting data from the data signal in the engine control device 30 will be described with reference to FIG. 6.

In step S201, the processing is on standby until an on-timing at which the data signal received from the transmission control device 20 is switched from the off-state to the on-state is detected.

In step S202, the on-time $T_{on}$ of the data signal is detected by using the internal clock of CPU 31.

In step S203, it is judged whether the on-time $T_{on}$ detected in the step S202 is within the first time range $TR_1$, within the second time range $TR_2$ or out of the first and second ranges $TR_1$ and $TR_2$.

If it is judged in step S203 that the on-time $T_{on}$ is equal to a value in the first time range $TR_1$, that is, $T_{on1}$, the processing shifts to step S204 to restore the state quantity data from the on-time $T_{on1}$. The engine control device 30 executes the control based on the restored state quantity data on the engine 34 according to a flow different from this flow.

On the other hand, if it is judged in step S203 that the on-time $T_{on}$ is equal to a value in the second time range $TR_2$, that is, $T_{on2}$, the processing shifts to step S205 to restore the abnormality data from the on-time $T_{on2}$ concerned. At this time, for example when the on-time $T_{on2}$ is set every abnormality target site (A, B, C) in the step S103 of the data signal generating flow described above, the abnormality data is restored while taking the error occurring in the on-time $T_{on2}$ into consideration, whereby the abnormality target site can be accurately identified. The engine control device 30 executes the fail safe control based on the restored abnormality data on the engine 34 according to a flow different from the main flow.

Furthermore, if it is judged in step S203 that the on-time $T_{on}$ is equal to a value out of the first and second time ranges $TR_1$ and $TR_2$, the processing shifts to step S206 to judge occurrence of communication abnormality. When it is judged that communication abnormality occurs, the engine control device 30 executes fail safe control different from that at the restoration time of the abnormality data on the engine 34 according to a flow different from this flow.

According to the first embodiment described above, when abnormality occurs in the automatic transmission 24, the state quantity data and the abnormality data are alternately transmitted from the transmission control device 20 to the engine control device 30. As a result, even in the engine control device 30 which does not target the automatic transmission 24 for control, the abnormality of the automatic transmission 24 is recognized and the fail safe control is executed, so that high safety can be secured. Furthermore, the alternate transmission of the state quantity data and the abnormality data contributes to simplification of the signal processing in the control devices 20, 30, and thus increase of the total communication speed containing the signal processing speed. In addition, when the automatic transmission 24 is normal, only the state quantity data is transmitted from the transmission control device 20 to the engine control device 30, and thus the time to be consumed by the transmission of one kind of state quantity data can be suppressed to the time of one period T. Accordingly, according to the first embodiment, the communication efficiency can be more greatly enhanced by the increase of the communication speed under the abnormal and the suppression of the data transmission time under the normal state.

Furthermore, according to the first embodiment, with respect to the on-time $T_{on1}$ of the data signal when the state quantity data is transmitted and the on-time $T_{on2}$ of the data signal when the abnormality data is transmitted, the set range $TR_1$ for the former is set to be broader than the set range $TR_2$ for the latter. Accordingly, the on-time $T_{on1}$ is made different from the on-time $T_{on2}$, and as a result the engine control device 30 can accurately identify which one of the state quantity data and the abnormality data the reception data from the transmission control device 20 corresponds to. Accordingly, it is unnecessary to transmit the data identifying signal between the control devices 20 and 30 separately from the data signal, so that the number of signal lines and thus the manufacturing cost can be reduced. Furthermore, the set range $TR_1$ of the on-time $T_{on1}$ is set to be broader than the set range $TR_2$ of the on-time $T_{on2}$ to thereby enhance the resolution of the state quantity data to be converted to the on-time $T_{on1}$, so that the communication precision can be enhanced.

Second Embodiment

Figure 7:
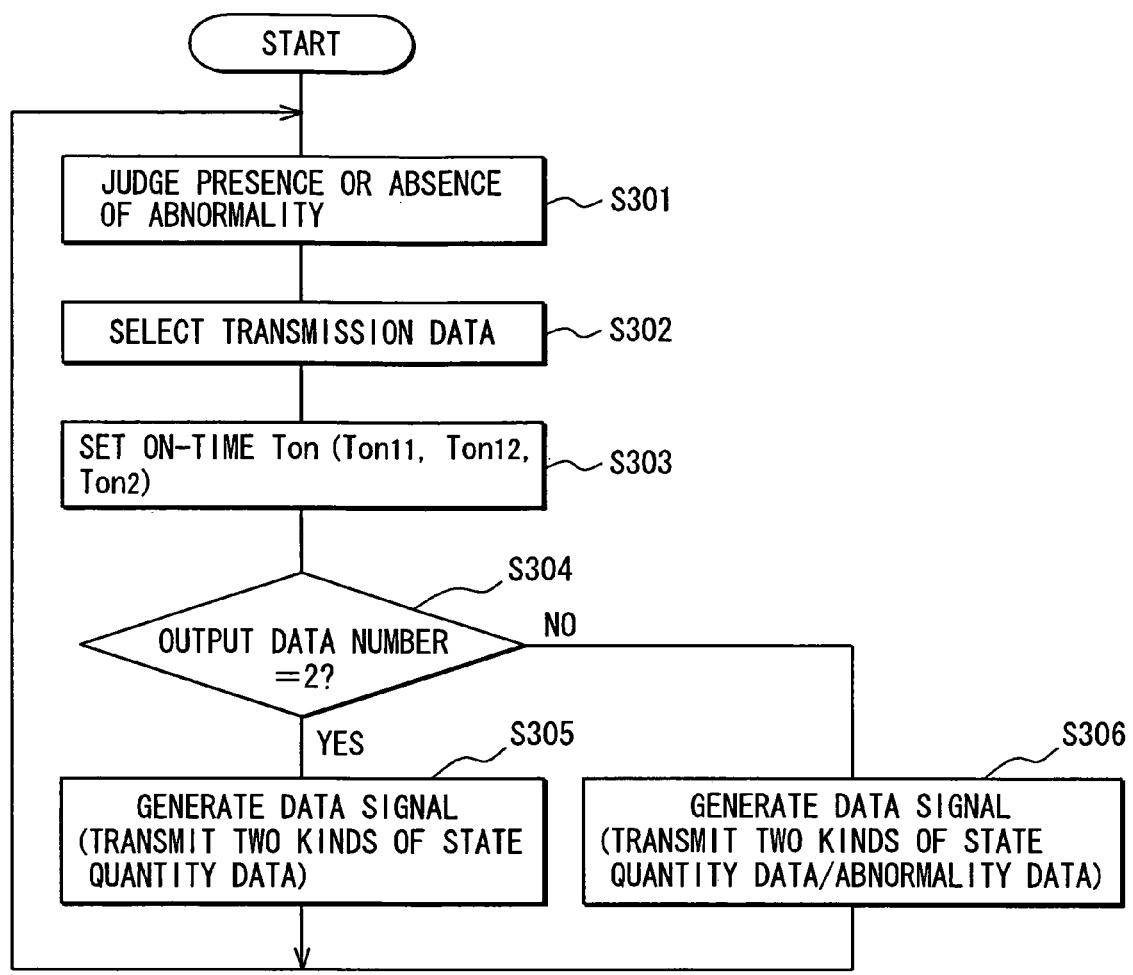
FIG. 7 is a flowchart showing the operation of a distributed control system according to a second embodiment.

As shown in FIG. 7, the second embodiment is a modification of the first embodiment, and substantially the same parts as the first embodiment are represented by the same reference numerals, and the description thereof is omitted.

In the data signal generating flow in the transmission control device 20 of the second embodiment, the step S301 is executed as in the case of the step S101 of the first embodiment.

In step S302, when the step is subsequent to the step S301 judging no abnormality, predetermined two kinds of state quantity data are selected. On the other hand, when the step is subsequent to the step S301 judging that there is some abnormality, the two kinds of state quantity data concerned and abnormality data are selected.

In step S303, when the step is subsequent to the step S302 selecting the two kinds of state quantity data, as shown in FIG. 8A, the on-time $T_{on11}$, $T_{on12}$ to which the respective state quantity data are allocated are set in the range of the first time range. In the step S303 subsequent to the step S102 selecting the two kinds of state quantity data and the abnormality data, as shown in FIG. 8A, the on-time $T_{on11}$, $T_{on12}$ to which the respective state quantity data are allocated are set within the first time range $TR_1$, and also as shown in FIG. 8B, the on-time $T_{on2}$ to which the abnormality data is allocated is set within the second time range $TR_2$. In any case, with respect to the on-time $T_{on11}$, $T_{on12}$, for example by setting them in different ranges respectively, the two kinds of state quantity data can be identified at the engine control device 30 side.

In step S304, it is judged whether there are two data selected in step S302. If the number of the selected data is equal to two, that is, under the normal state that the two kinds of state quantity data are output, the processing shifts to step S305. If the number of the selected data is not equal to two, that is, under the abnormal state that the two kinds of state quantity data and the abnormality data are output, the processing shifts to step S306.

In step S305, each of the pulses of the on-time period $T_{on11}$, $T_{on12}$ set in step S303 is serially output at the period T, whereby the processing shifts to step S301 after the data signal is generated. Accordingly, when the steps S301 to S305 are repetitively carried out, each of the two kinds of state quantity data is serially transmitted at the time corresponding to one period T as shown in FIG. 8A.

In step S306, each of the pulses of the on-time $T_{on11}$, $T_{on12}$, $T_{on2}$ set in step S303 is serially output at the period T, whereby the processing shifts to step S301 after the data signal is generated. Here, with respect to the output of the pulses, as shown in FIG. 8B, the output of the pulse of the on-time $T_{on2}$ may be executed after the pulse output of the on-time $T_{on11}$, $T_{on12}$ is executed, or the pulse output of the on-time $T_{on11}$, $T_{on12}$ may be executed after the pulse output of the on-time $T_{on2}$ is executed, or the pulse output of the on-time $T_{on2}$ may be executed between the pulse output of the on-time $T_{on11}$ and the pulse output of the on-time $T_{on12}$. Accordingly, as shown in FIG. 8B, when the steps S301 to S304, S306 in the second embodiment as described above are repetitively executed, each of the two kinds of state quantity data and the abnormality data is serially transmitted at the time corresponding to one period T.

According to the second embodiment described above, under the abnormal state of the automatic transmission 24, the high safety can be secured by the same principle as the first embodiment. In addition, under the normal state of the automatic transmission 24, each of the two kinds of state quantity data is transmitted from the transmission control device 20 to the engine control device 30 at the time corresponding to one period T, and thus the communication efficiency can be more greatly enhanced as compared with the prior art.

Furthermore, according to the second embodiment, with respect to the on-time $T_{on11}$, $T_{on12}$ of the data signal when the state quantity data is transmitted and the on-time $T_{on2}$ of the data signal when the abnormality data is transmitted, the set range $TR_1$ for the former is set to be broader than the set range $TR_2$ of the latter. Accordingly, the reduction of the cost and the enhancement of the communication precision can be performed by the same principle as the first embodiment.

Third Embodiment

Figure 9:
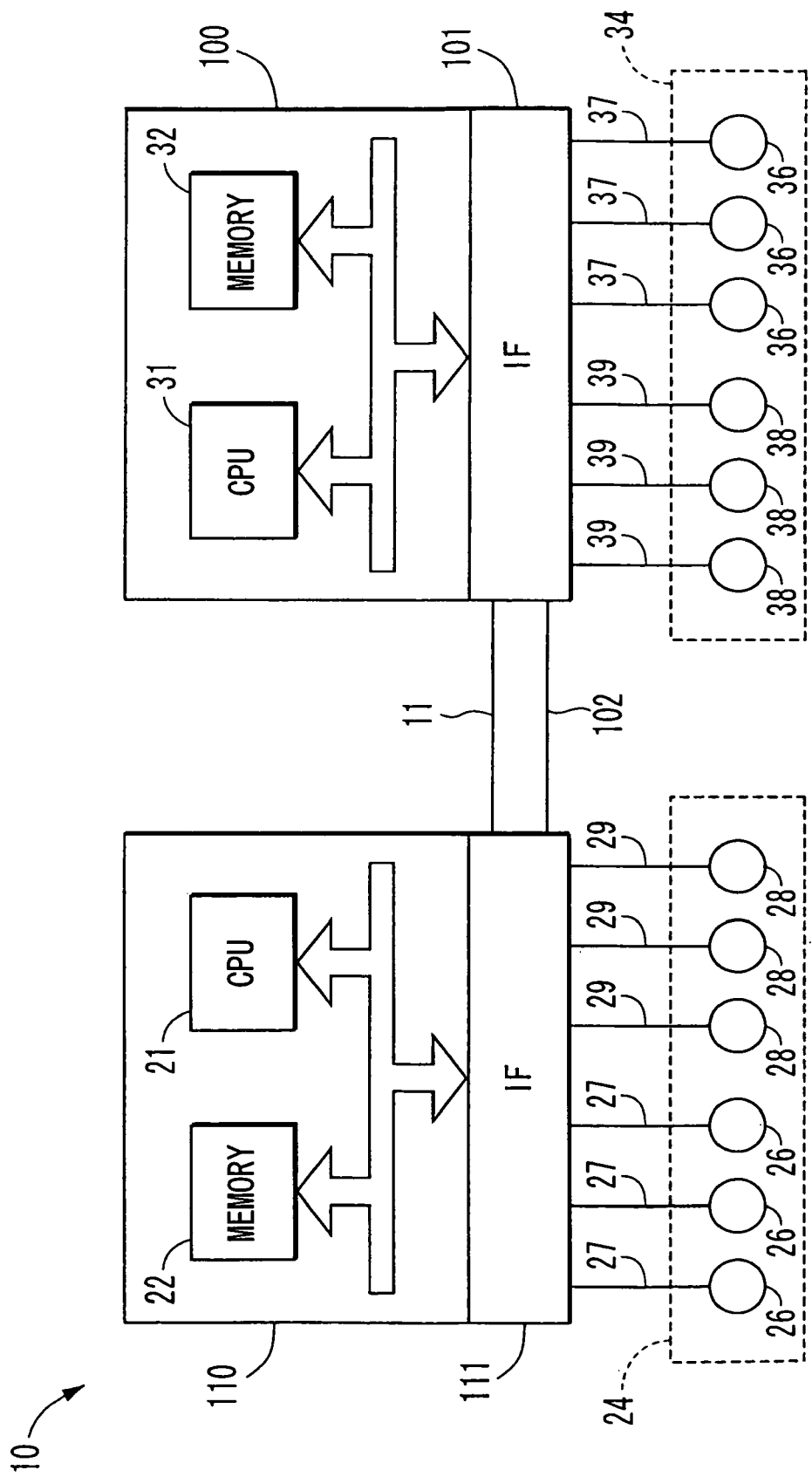
FIG. 9 is a block diagram showing a distributed control system according to a third embodiment.

As shown in FIG. 9, the third embodiment is a modification of the first embodiment. Substantially the same parts as the first embodiment are represented by the same reference numerals, and the description thereof is omitted.

The input/output interface 101 of an engine control device 100 is connected to the input/output interface 111 of a transmission control device 110 through signal lines 11, 102. The engine control device 100 generates a data signal to be output to the transmission control device 110 through the signal line 102 in addition to the data extraction and the signal generation described with respect to the first embodiment. Here, the flow of generating the data signal in the engine control device 100 is carried out in conformity with the data signal generating flow in the transmission control device 20 described with respect to the first embodiment. In the step corresponding to the step S101, the presence or absence of occurrence of abnormality in the engine 34 is judged on the basis of specific one or plural engine sensors 36, the reception state of the control signal by an engine electrical component 38, etc. Furthermore, the state quantity data selected in the step corresponding to the step S102 may be detection data of the engine sensor 36 representing a state quantity, or a state quantity calculated on the basis of the detection data of the plural engine sensors 36, for example, data representing a running state (upslope, downslope) or the like.

In addition to the data extraction described with respect to the first embodiment, the transmission control device 110 extracts data transmitted through a data signal from the engine control device 100, and also generates a control signal for each circuit electrical component 28 on the basis of the detection data of each transmission sensor 26. Here, the flow of extracting the data from the data signal in the transmission control device 110 is executed in conformity with the flow of extracting the data from the data signal in the engine control device 30 described in the first embodiment. However, when the state quantity data is restored in the step corresponding to the step S204, the transmission control device 110 executes the control based on the restoring data concerned on the automatic transmission 24. On the other hand, when abnormality data is restored in the step corresponding to the step S205, and when it is judged in the step corresponding to the step S206 that there is some communication abnormality, the transmission control device 110 executes predetermined fail safe control on the automatic transmission 24.

According to the third embodiment described above, when abnormality occurs in the engine 34 or the automatic transmission 24, the state quantity data and the abnormality data are alternately transmitted between the control devices 100, 110. As a result, each of the control device 110 which does not target the engine 34 for control and the control device 100 which does not target the automatic transmission 24 for control recognizes abnormality of each of non-control target elements 34, 24 and thus executes the fail safe control, so that high safety can be secured. Furthermore, the alternate transmission between the state quantity data and the abnormality data contributes to simplification of the signal processing of the control devices 100, 110 and thus increase of the total communication speed containing the signal processing speed. In addition, when the engine 34 or the automatic transmission 24 is normal, only the state quantity data is transmitted between the control devices 100, 110, so that the time to be consumed by the transmission of one kind of state quantity data can be suppressed to the time of one period T. Accordingly, according to the first embodiment, the communication efficiency can be more greatly enhanced by the increase of the communication speed under the abnormal state and the suppression of the data transmission time under the normal state.

Furthermore, according to the third embodiment, the cost can be reduced and the communication precision can be enhanced by the same principle as the first embodiment.

Fourth Embodiment

Figure 10:
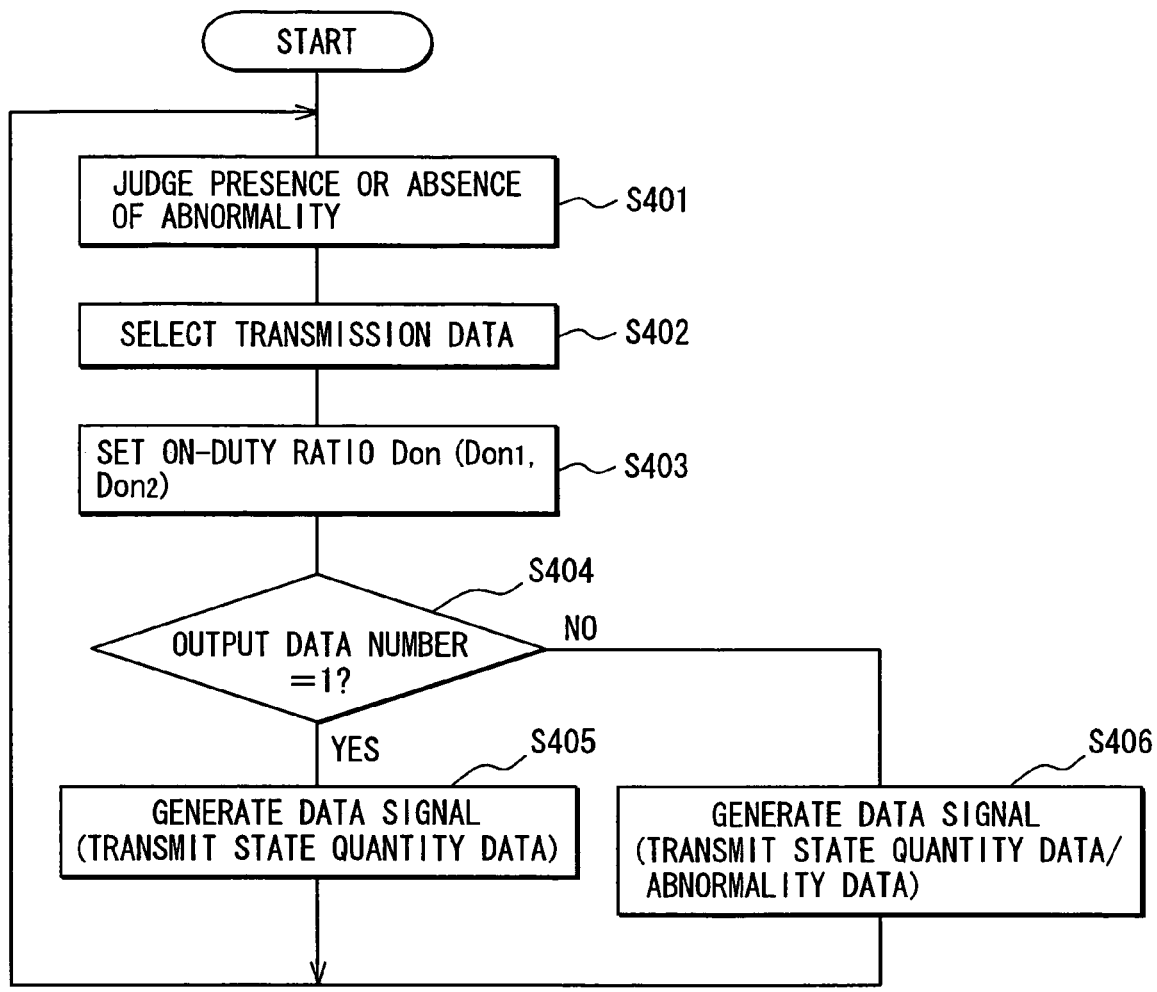
FIG. 10 is a flowchart showing the operation of a distributed control system according to a fourth embodiment.

As shown in FIG. 10, the fourth embodiment is a modification of the first embodiment. Substantially the same parts as the first embodiment are represented by the same reference numerals, and the description thereof is omitted.

In the data signal generating flow of the transmission control device 20 of the fourth embodiment, steps S401 and S402 are executed as in the case of the steps S101 and S102 of the first embodiment.

Figure 11A:
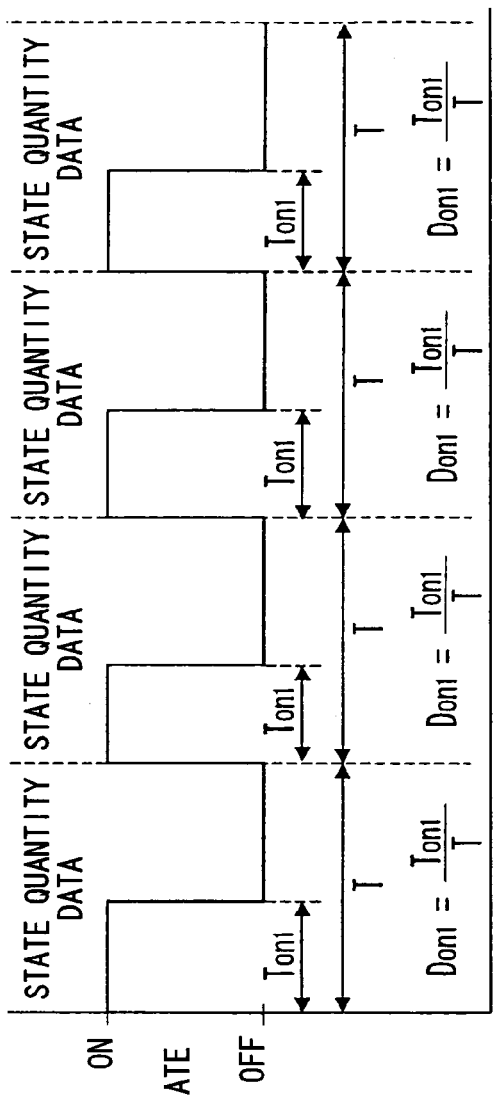
FIGS. 11A-11B are diagrams showing the operation of the distributed control system according to the fourth embodiment.
Figures 12, 13:
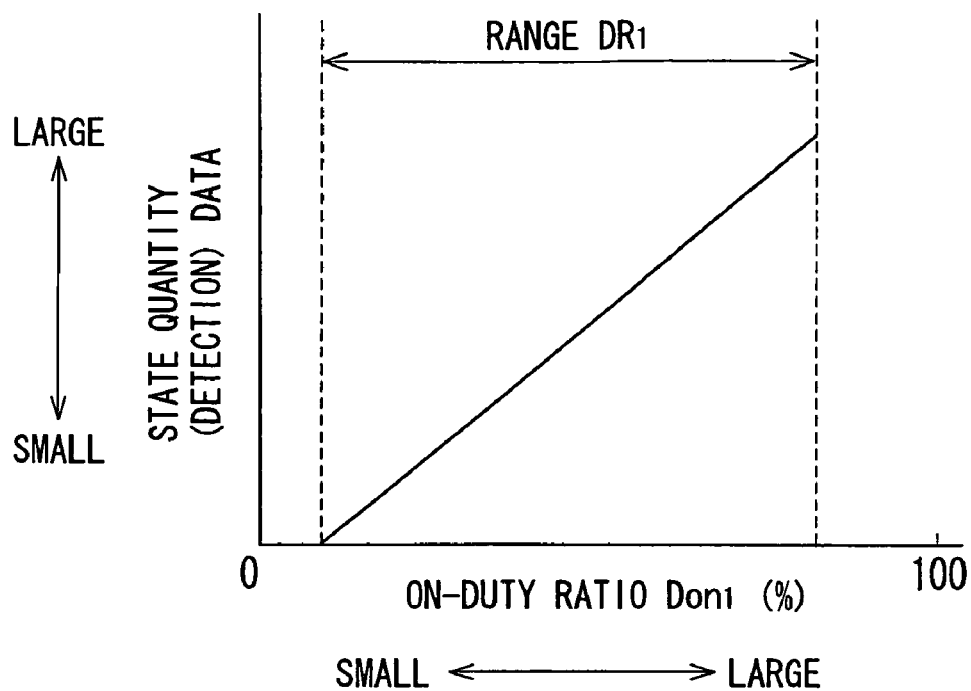
FIG. 12 is a diagram showing the operation of the distributed control system according to the fourth embodiment.
FIG. 13 is a diagram showing the operation of the distributed control system according to the fourth embodiment.

In step S403, the on-duty ratio Don for allocating the data selected in step S402 in the data signal, that is, the rate of the on-time $T_{on}$ to the predetermined period T is set. At this time, when the step is subsequent to the step S402 selecting only the state quantity data, the on-duty ratio $D_{on1}$ for allocating the state quantity data as shown in FIG. 11A is set within a first duty ratio range DR1. Here, the first duty ratio range DR1 is preset in the range of 50% to 80%, for example, and the on-duty ratio $D_{on1}$ is set so as to have a linear relationship as shown in FIG. 12 with the numerical value of the detection data corresponding to the state quantity data, for example.

Figure 11B:
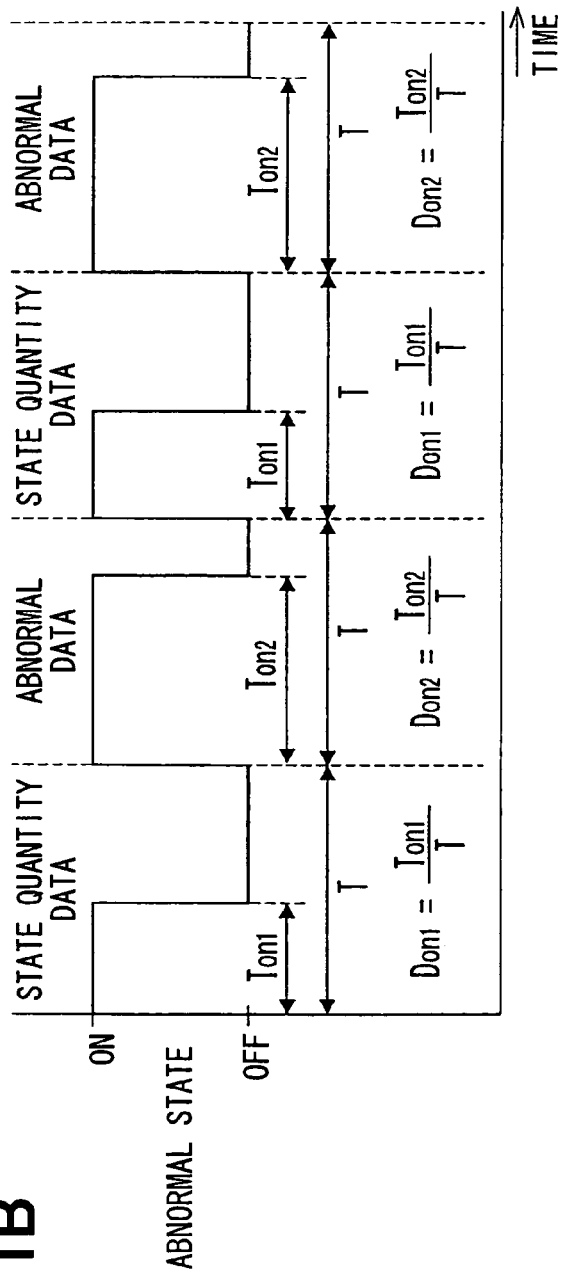

On the other hand, when the step is subsequent to the step S402 selecting both the state quantity data and the abnormality data, the on-duty ratio $D_{on1}$ for allocating the state quantity data as shown in FIG. 11B is set within the first duty ratio range DR1, and the on-duty ratio $D_{on2}$ for allocating the abnormality data as shown in FIG. 11B is set within a second duty ratio range DR2. Here, with respect to the first duty ratio range DR1 and the on-duty ratio $D_{on1}$, they are the same as the case where the step is subsequent to the step S402 selecting only the state quantity data. The second duty ratio range DR2 is preset, for example, in the range from 85% to 95% so that it is not overlapped with the first duty ratio range DR1, and more preferably it is narrower than the first duty ratio range DR1. Furthermore, the on-duty ratio $D_{on2}$ is set to have a discrete value every site (A, B, C) when plural target sites for abnormality judgment exist as shown in FIG. 13.

In step S404, by executing the same processing as the step S104 of the first embodiment, the processing shifts to step S405 when the number of the selected data in step S402 is equal to 1 or shifts to step S406 when the number of the selected data is not equal to 1.

In step S405, the pulse of the on-duty ratio $D_{on1}$ set in step S403 is output at the period T by using the internal clock of CPU 21, thereby generating a data signal. After the step S405 is finished, the processing returns to step S401. Accordingly, when the steps S401 to S405 are repetitively executed because the automatic transmission 24 is normal, one kind of state quantity data is serially transmitted at the time corresponding to one period T as shown in FIG. 11A.

On the other hand, in step S406, each of the pulse of the on-duty ratio $D_{on1}$ set in step S403 and the pulse of the on-duty ratio $D_{on1}$ set in step S403 is serially output at the period T by using the internal clock of CPU 21, thereby generating the data signal. At this time, as shown in FIG. 11B, the latter pulse may be output after the former pulse is output, or the former pulse may be output after the latter pulse is output. After the step S406 as described above is finished, the processing also returns to step S401 as in the case of the step S405. Accordingly, when the steps S401 to S404, S406 are repetitively carried out because abnormality occurs in the automatic transmission 24, for example as shown in FIG. 11B, the state quantity data and the abnormality data are alternately serially transmitted at the time of one period.

Figure 14:
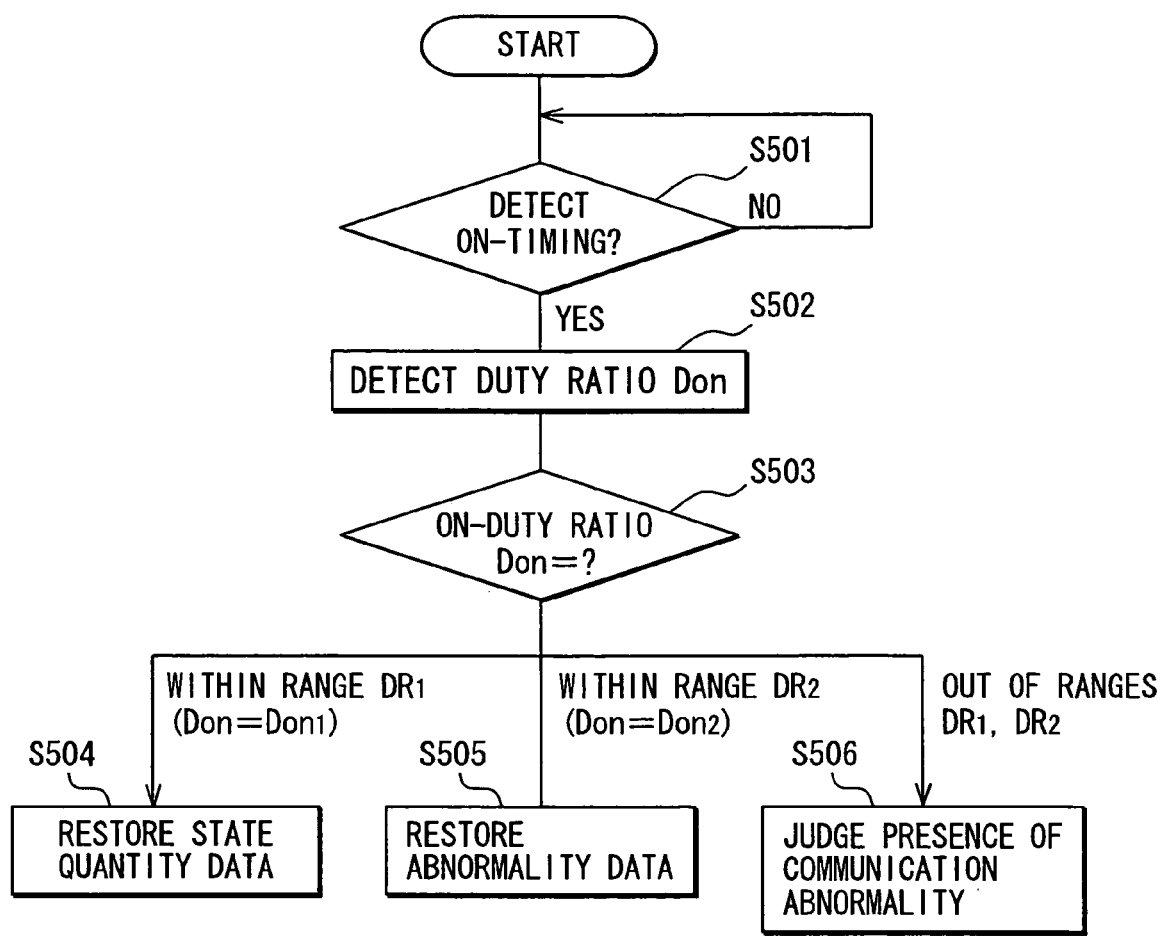
FIG. 14 is a flowchart showing the operation of the distribution control system according to the fourth embodiment.

Furthermore, in the flow of extracting the data from the data signal in the engine control device 30 of the fourth embodiment, the step S501 is executed as in the case of the step S201 of the first embodiment as shown in FIG. 14.

In step S502, the on-duty ratio Don of the data signal is detected by using the internal clock of CPU 31.

In step S503, it is judged whether the on-duty ratio Don detected in step S502 is within the first duty ratio range DR1, within the second duty range DR2 or out of the first and second duty ratio ranges DR1, DR2.

If it is judged in step S503 that the on-duty ratio Don is equal to a value in the first duty ratio range DR1, that is, $D_{on1}$, the processing goes to step S504, and restores the state quantity data from the on-duty ratio $D_{on1}$ concerned. The engine control device 30 controls the engine 34 on the basis of the state quantity data thus restored as in the case of the first embodiment.

On the other hand, if it is judged in step S503 that the on-duty ratio Don is equal to a value in the second duty ratio range DR2, that is, $D_{on2}$, the processing goes to step S505 to restore the abnormality data from the on-duty ratio $D_{on2}$ concerned. At this time, when the on-duty ratio $D_{on2}$ is set every abnormality target site (A, B, C) in the step S403 of the data signal generating flow, the abnormality target site can be accurately identified by restoring the abnormality data while taking the error occurring in the on-duty ratio $D_{on2}$ into consideration. As in the case of the first embodiment, the engine control device 30 carries out the fail safe control based on the restored abnormality data on the engine 34.

On the other hand, if it is judged in step S503 that the on-duty ratio Don is equal to a value out of the ranges DR1, DR2, the processing shifts to step S506, and it is judged that occurrence of communication abnormality is judged. As in the case of the first embodiment, the engine control device 30 carries out fail safe control different from that at the restoration time of the abnormality data on the engine 34.

According to the fourth embodiment described above, the securing of the safety and the enhancement of the communication efficiency can be implemented by the same principle as the first embodiment.

Furthermore, according to the fourth embodiment, with respect to the on-duty ratio $D_{on1}$ of the data signal when the state quantity data is transmitted and the on-duty ratio $D_{on2}$ of the data signal when the abnormality data is transmitted, the set range DR1 of the former is set to be broader than the set range DR2 of the latter. Accordingly, the cost reduction and the enhancement of the communication principle can be preformed by the same principle as the first embodiment.

In addition, according to the fourth embodiment, the data is converted to the on-duty ratio Don of the data signal, and thus the signal processing precision, and thus the communication precision can be more enhanced as compared with the case where the data is converted to the on-time $T_{on}$ of the data signal.

Fifth Embodiment

Figure 15:
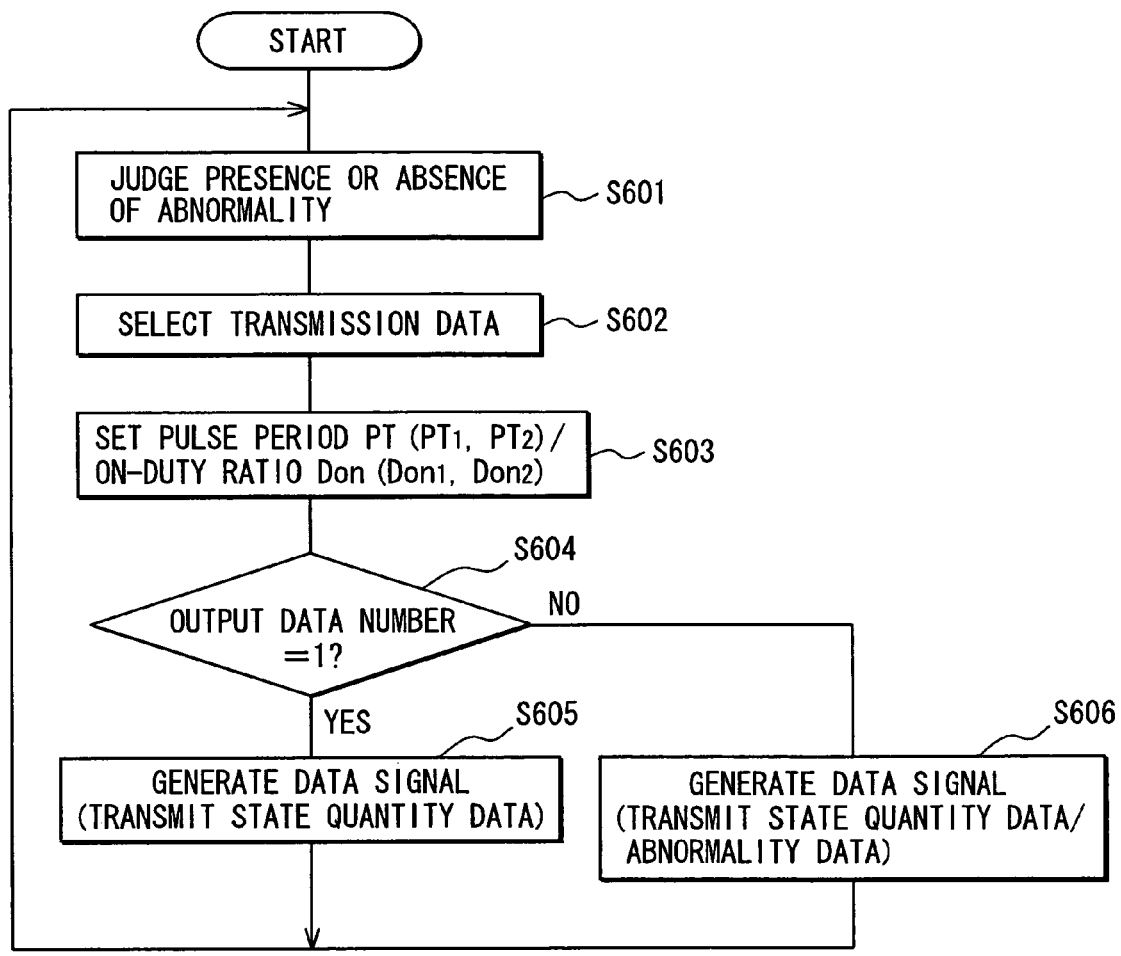
FIG. 15 is a flowchart showing the operation of a distributed control system according to a fifth embodiment.

As shown in FIG. 15, a fifth embodiment is a modification of the first embodiment, and substantially the same reference numerals as the first embodiment are represented by the same reference numerals, and the description thereof is omitted.

In the data signal generating flow of the transmission control device 20 of the fifth embodiment, steps S601, 602 are executed as in the case of the steps S101, S102 of the first embodiment.

Figure 16A:
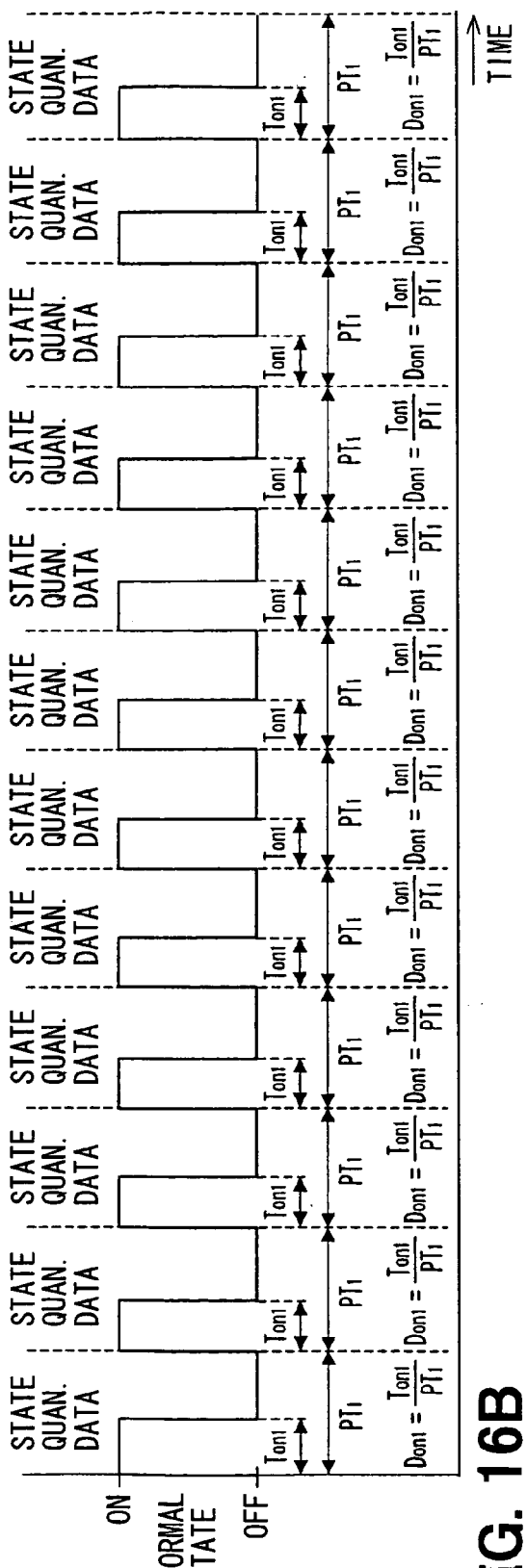
FIGS. 16A-16B are diagrams showing the operation of the distributed control system according to the fifth embodiment.
Figure 16B:
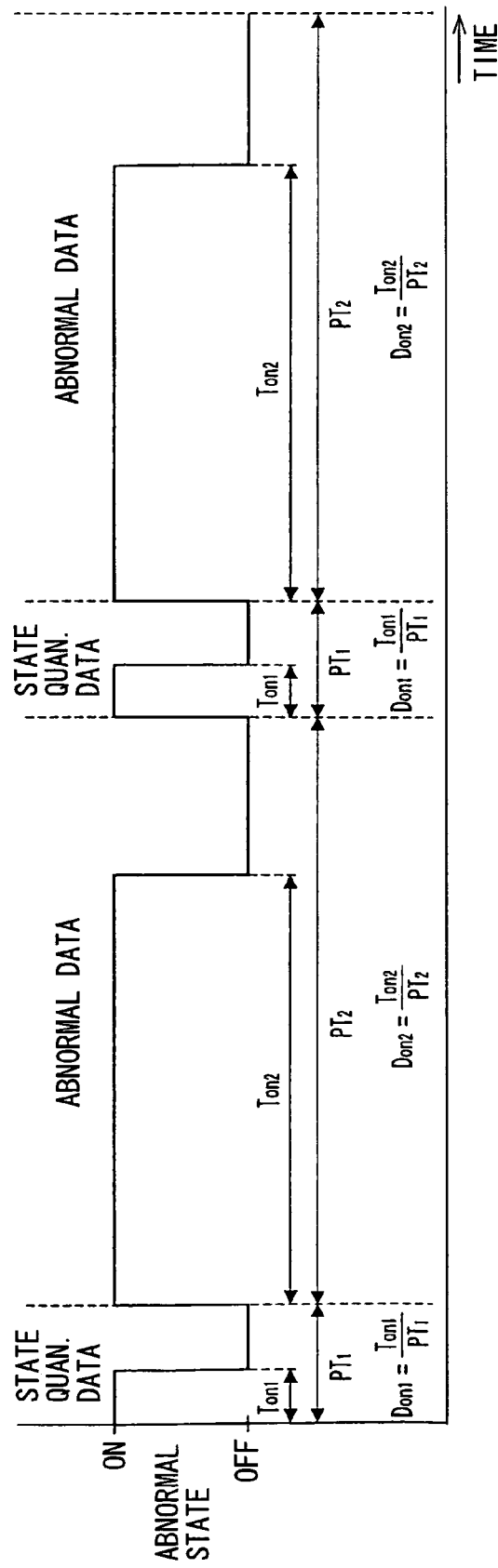
Figures 17, 18:
FIG. 17 is a diagram showing the operation of the distributed control system according to the fifth embodiment.
FIG. 18 is a diagram showing the operation of the distributed control system according to the fifth embodiment.

In step S603, the pulse period PT and the on-duty ratio Don for allocating the data selected in step S102 in the data signal are set. At this time, when the step is subsequent to the step S602 selecting only the state quantity data, the pulse period $PT_1$ and the on-duty ratio $D_{on1}$ for allocating the state quantity data are set as shown in FIG. 16A. Here, the pulse period $PT_1$ is set to about 10 ms, for example. Furthermore, the on-duty ratio $D_{on1}$ corresponds to the rate of the on-time $T_{on1}$ to the pulse period $PT_1$, and it is set in the range from 0% to 100%. For example, the on-duty ratio $D_{on1}$ is set to have a linear relationship as shown in FIG. 17 with the numerical value of the detection data corresponding to the state quantity data. On the other hand, when the step is subsequent to the step S602 selecting both the state quantity data and the abnormality data, the pulse period $PT_1$ and the on-duty ratio $D_{on1}$ for allocating the state quantity data as shown in FIG. 16B, and also the pulse period $PT_2$ and the on-duty ratio $D_{on2}$ for allocating the abnormality data are set as shown in FIG. 16B. Here, with respect to the pulse period $PT_1$ and the on-duty ratio $D_{on1}$, the same as the case where the step is subsequent to the step S602 selecting only the state quantity data is applied. Furthermore, the pulse period $PT_2$ is set to, for example, about 50 ms so that it is not overlapped with the pulse period $PT_1$, more preferably it is longer than the pulse period $PT_1$. Furthermore, the on-duty ratio $D_{on2}$ is the rate of the on-time $T_{on2}$ to the pulse period $PT_2$, and it is set in the range from 0% to 100%. For example, when there exist plural target sites for abnormality judgment as shown in FIG. 18, the on-duty ratio $D_{on2}$ is set to have a discrete value every site (A, B, C) and every combination thereof.

In step S604, the same processing as the step S104 of the first embodiment is executed, whereby the processing shifts to step S605 when only one data is selected in step S602, and also shifts to step S606 when the number of selected data is not equal to one.

In step S605, pulses are output at the period $PT_1$, and the on-duty ratio $D_{on1}$ set in step S603 by using the internal clock of CPU 21 to thereby generate the data signal. After the step S605 is finished, the processing returns to step S601. Accordingly, when the steps S601 to S605 are repetitively executed because the automatic transmission 24 is normal, one kind of state quantity data is serially transmitted at the time corresponding to the pulse period $PT_1$ as shown in FIG. 16A.

In step S606, the pulse of the period $PT_1$ and the on-duty ratio $D_{on1}$ set in step S603, and the pulse of the period $PT_2$ and the on-duty ratio $D_{on2}$ set in the same step S603 are serially output to thereby generate the data signal using the internal clock of the CPU 21. At this time, as shown in FIG. 16B, the latter pulse may be output after the former pulse is output, or the former pulse may be output after the latter pulse is output.

After the step S606 as described above is finished, the processing returns to step S601 as in the case of the step S605. Accordingly, when the steps S601 to S604, S606 are repetitively carried out because abnormality occurs in the automatic transmission 24, the state quantity data and the abnormality data are alternately serially transmitted at the times corresponding to the pulse periods $PT_1$, $PT_2$, respectively.

Figure 19:
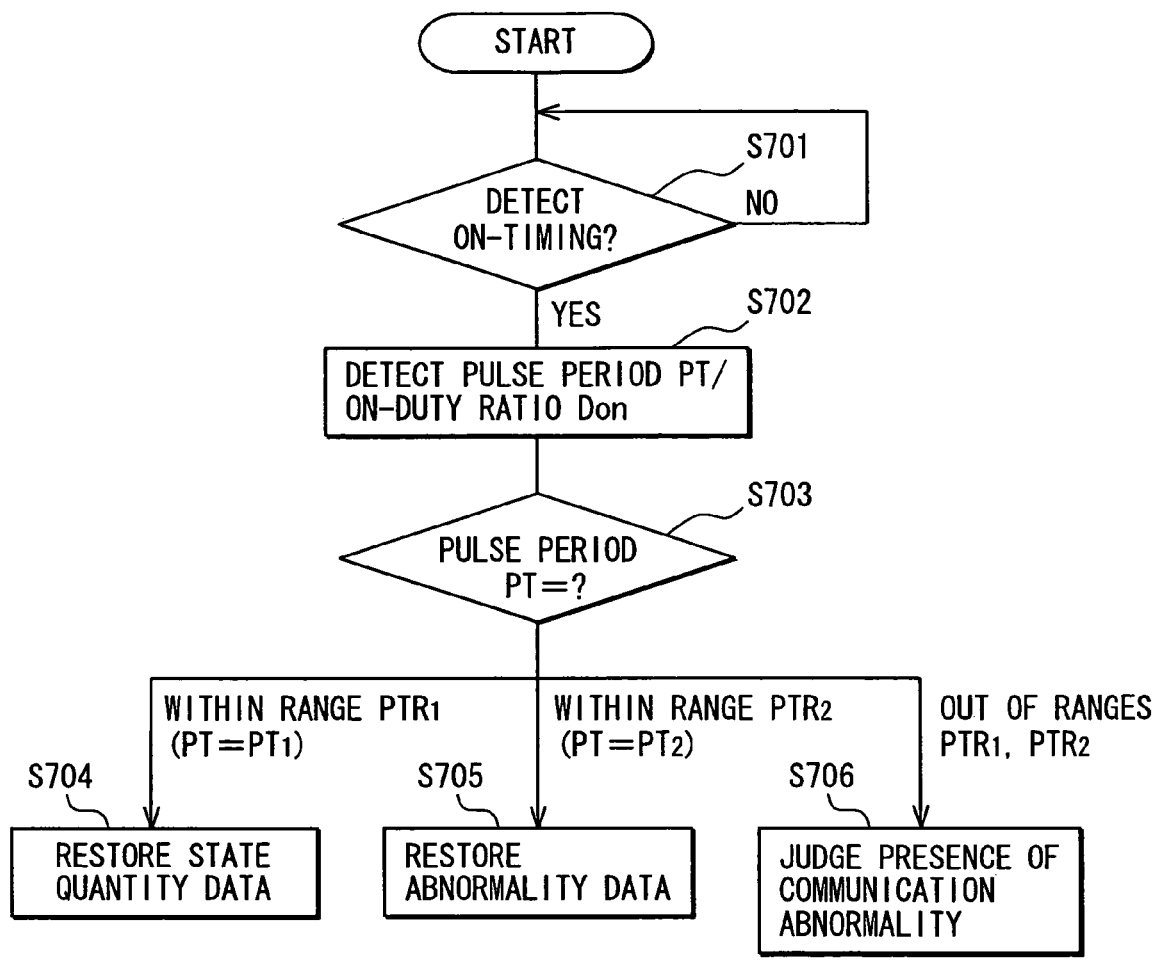
FIG. 19 is a flowchart showing the operation of the distributed control system according to the fifth embodiment.
Figures 20A, 20B:
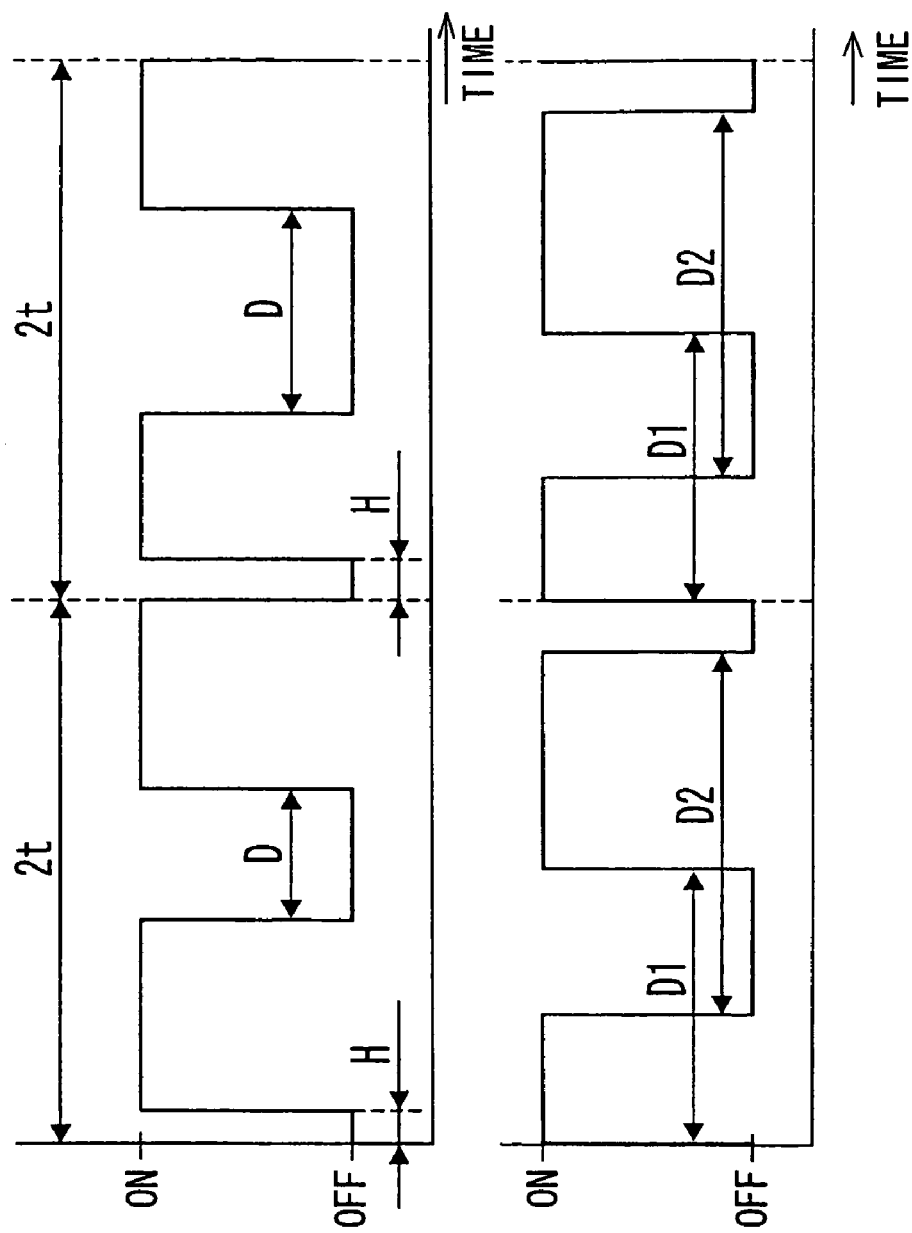
FIGS. 20A-20B are diagrams showing the operation of a prior art.

As shown in FIG. 19, in the flow of extracting the data from the data signal in the engine control device 30 of the fifth embodiment, step S701 is executed as in the case of the step S210 of the first embodiment.

In step S702, the pulse period PT and the on-duty ratio Don of the data signal are detected by using the internal clock of CPU 31.

In step S703, it is judged whether the pulse period PT detected in step S702 is in a first period range $PTR_1$, a second period range $PTR_2$ or out of the first and second period ranges $PTR_1$ and $PTR_2$. Here, the first period range $PTR_1$ is preset in consideration of an error occurring in the pulse period $PT_1$, and when the pulse period $PT_1$ is set to about 10 ms in the step S603 of the data signal generating flow, it is set in the range from 8 ms to 12 ms. Furthermore, the second period range $PTR_2$ is preset in consideration of an error occurring in the pulse period $PT_2$, and when the pulse period $PT_2$ is set to about 50 ms in the step S603 of the data signal generating flow, it is set in the range from 48 ms to 52 ms.

If it is judged in step S703 that the pulse period PT is in the first period range $PTR_1$, that is, it is the pulse period $PT_1$, the processing shifts to step S704 to restore the state quantity data from the on-duty ratio $D_{on1}$ detected in step S702. As in the case of the first embodiment, the engine control device 30 controls the engine 34 on the basis of the state quantity data thus restored.

On the other hand, if it is judged in step S703 that the pulse period PT is in the second period range $PTR_2$, that is, it is the pulse period $PT_2$, the processing shifts to step S705 to restore the abnormality data from the on-duty ratio $D_{on2}$ detected in step S702. At this time, for example when the on-duty ratio $D_{on2}$ is set every abnormality site (A,B,C) and every combination thereof in the step S603 of the data signal generating flow, the abnormality data is restored in consideration of the on-duty ratio $D_{on2}$, whereby the abnormality target site can be accurately identified. As in the case of the first embodiment, the engine control device 30 executes the fail safe control based on the restored abnormality data on the engine 34.

Furthermore, when it is judged in step S703 that the pulse period PT is equal to a value out of the ranges $PTR_1$, $PTR_2$, the processing shifts to step S706 to judge that communication abnormality occurs. As in the case of the first embodiment, the engine control device 30 executes fail safe control different from that at the restoration time of the abnormality data on the engine 34.

According to the fifth embodiment described above, the securing of safety and the enhancement of the communication efficiency can be implemented by the same principle as the first embodiment.

Furthermore, according to the fifth embodiment, the pulse period $PT_1$ of the data signal when the state quantity data is transmitted is set to be shorter than the pulse period $PT_2$ of the data signal when the abnormality data is transmitted. Accordingly, in the engine control device 30, it can be accurately identified which one of the state quantity data and the abnormality data the reception data from the transmission control device 20 corresponds to. Therefore, the number of signal lines, and thus the cost can be reduced as in the case of the first embodiment. Furthermore, the pulse period $PT_1$ is set to be shorter than the pulse period $PT_2$, whereby the pulse period PT₁ of the data signal is set to be as short as possible to enhance the effect of increasing the communication efficiency when the automatic transmission 24 is normal.

Furthermore, according to the fifth embodiment, the data type is transmitted on the basis of the pulse period PT of the data signal, and also the details of the data are transmitted on the basis of the on-duty ratio Don of the data signal. Accordingly, the range of the on-duty ratio Don can be set to the maximum range of 0% to 100%, and thus the resolution of the state quantity data can be enhanced. In addition, as shown in FIG. 18, the number of types of abnormality transmitted as the abnormality data can be increased.

In addition, according to the fifth embodiment, the details of the data are transmitted on the basis of the on-duty ratio Don of the data signal, and thus the signal processing precision can be more enhanced as compared with the case where the data are transmitted by the on-time $T_{on}$ of the data signal. Therefore, according to the fifth embodiment, the communication precision can be enhanced.

The invention is not limited to the above embodiments, and also is not interpreted on the basis of these embodiments.

Specifically, the first to fifth embodiments were discussed with reference to an exemplary implementation within the distributed control system for a vehicle providing data transmission between the transmission control device and the engine control device; however, the embodiments are not limited to such an implementation. For example, the embodiments may be applied to data transmission between the engine control device a control device other than the transmission control device in the distributed control system for the vehicle, such as an air intake control device or the like, or data transmission between control devices between in a distributed control system for equipment other than the vehicle.

Furthermore, in the first to fifth embodiment, each control device of the distributed control system is mainly constructed by a microcomputer having CPU. However, at least one control device may be constructed by an electrical circuit having no microcomputer.

Still furthermore, in the first to third embodiments, the data are converted to the on-time of the data signal, however, the data may be converted to the off-time of the data signal. Furthermore, in the fourth and fifth embodiments, the data are converted to the on-duty ratio of the data signal, however, the data may be converted to the off-duty ratio of the data signal, that is, the rate of the off-time to the period.

Still furthermore, in the second embodiment, three or more kinds of state quantity data may be transmitted under the normal state and under the abnormal state. Furthermore, in the third to fifth embodiment, two or three or more state quantity data may be transmitted under the normal state and under the abnormal state as in the case of the second embodiment.

In addition, in the third embodiment, the data transmission from the transmission control device to the engine control device may be inhibited from being carried out. Furthermore, in the third embodiment, interactive data transmission between respective control devices may be executed according to the method of the fourth or fifth embodiment.

What is claimed is:

1. A distributed control system comprising:
   a plurality of control devices including a transmission side control device and a reception side control device; and
   a signal line for providing communication of data between the plurality of control devices, wherein:
   the distributed control system dispersively controls control targets of the plurality of control devices while serially-transmitting data through a pulse train signal via the signal line among the plurality of control devices;
   when a control target of a transmission side control device is normal, the transmission side control device transmits state quantity data representing a state quantity of the normal control target concerned to the reception side control device;
   when an abnormality occurs in the control target of the transmission side control device, the transmission side control device transmits abnormality data representing the abnormality concerned and the state quantity data alternately at a same period to the reception side control device in a predetermined order;
   the abnormality data is not transmitted when the control target of the transmission side control device is normal; and
   when an on-duty ratio or off-duty ratio of the pulse train signal is defined as a noted duty ratio, the noted duty ratio when the state quantity data is transmitted and the noted duty ratio when the abnormality data is transmitted are made different from each other in a predetermined range so as not to be overlapped.

2. The distributed control system according to claim 1, wherein the range of the noted duty ratio when the state quantity data is set to be broader than the range of the noted duty ratio when the abnormality data is transmitted.

3. A control device for use as a component in a distributed control system, the control device comprising:
   a computer, and
   a computer readable storage medium for tangibly storing instructions executable by the computer, wherein:
   the instructions are executed by the computer to control a control target while serially transmitting data to a reception side control device by a pulse train signal, the reception side control device comprising a component of the distributed control system,
   when the control target is normal, the control device transmits state quantity data representing the state quantity of the control target to the reception control device,
   when an abnormality occurs in the control target, the control device transmits abnormality data representing the abnormality concerned and the state quantity data alternately at a same period to the reception control device in a predetermined order,
   the abnormality data is not transmitted when the control target of the control device is normal, and
   when an on-duty ratio or off-duty ratio of the pulse train signal is defined as a noted duty ratio, the noted duty ratio when the state quantity data is transmitted and the noted duty ratio when the abnormality data is transmitted are made different from each other in a predetermined range so as not be overlapped.

4. A control device for use as a component in a distributed control system, the control device comprising:
   a computer; and
   a computer readable storage medium for tangibly storing instructions executable by the computer, wherein:
   the instructions are executed by the computer to control a control target while receiving data serially transmitted from a transmission side control device by a pulse train signal, the transmission side control device comprising a component of the distributed control system,
   when a control target of the transmission side control device is normal, the control device receives state quantity data representing a state quantity of the normal control target concerned from the transmission side control device, when an abnormality occurs in the control target of the transmission side control device, the control device receives abnormality data representing the abnormality concerned and the state quantity data alternately at a same period from the transmission side control device in a predetermined order, and when an on-duty ratio or off-duty ratio of the pulse train signal is defined as a noted duty ratio, the noted duty ratio when the state quantity data is transmitted and the noted duty ratio when the abnormality data is transmitted are made different from each other in a predetermined range so as not be overlapped.

* * * * *